United States Patent [19]

Czegledi

[11] 4,223,811
[45] Sep. 23, 1980

[54] FLUID METERING, MIXING AND DISPENSING MACHINE

[76] Inventor: Imre Czegledi, 10 Mill St., Paterson, N.J. 07501

[21] Appl. No.: 640,789

[22] Filed: Dec. 15, 1975

[51] Int. Cl.$^2$ .......................... B29B 5/00; B01F 7/24
[52] U.S. Cl. ................................ 222/136; 222/144.5; 222/318; 137/563; 137/599; 251/205; 366/133; 366/156; 366/177; 366/186; 425/208; 425/217
[58] Field of Search ..................... 222/318, 144.5, 136; 137/563, 599; 425/208, 207, 217; 259/7; 366/133, 156, 177, 186

[56] References Cited

U.S. PATENT DOCUMENTS

| | | | |
|---|---|---|---|
| 2,734,715 | 2/1956 | Knox | 251/315 X |
| 3,025,001 | 3/1962 | Robson | 259/124 X |
| 3,067,987 | 12/1962 | Ballou et al. | 259/7 |
| 3,075,550 | 1/1963 | Keith | 137/599 |
| 3,075,749 | 1/1963 | Mason et al. | 239/124 X |
| 3,240,432 | 3/1966 | Boettler | 239/124 |
| 3,637,136 | 1/1972 | Bok | 137/563 X |
| 3,924,651 | 12/1975 | Hippel et al. | 137/563 X |

FOREIGN PATENT DOCUMENTS 942014  2/1974  Canada ....................................... 425/208

*Primary Examiner*—Robert J. Spar
*Assistant Examiner*—Frederick K. Handren
*Attorney, Agent, or Firm*—Spencer & Kaye

[57] ABSTRACT

A machine for mixing, metering and dispensing fluids such as polyurethane, elastomers etc., composed of a number of fluid components. A valve assembly, during a recirculation cycle, receives a component from a source and returns the component to the source. During a shot cycle, the valve assembly directs at least part of the component into a mixing chamber which receives a component from another valve assembly to mix them and form, for example, polyurethane. In one embodiment, the valve assembly has a partition which divides the component entering the assembly into at least two channels, both of which direct fluid back to the source. One of the channels also has a port communicating with the mixing chamber. Each channel has a rototable ball valve, in which the one channel ball valve is rotatable to direct a predetermined amount of fluid to the mixing chamber and to the source. The other ball valve is rotatable to close its channel a predetermined degree and create an increased back pressure to force more component into the one channel during the shot cycle. Calibration levers are connected to each ball valve to preset their degree of rotation and provide a predetermined quantity of component in the mixing chamber. A control system controls the timing of the rotation of the ball valves as well as another valve assembly which introduces purge material into the mixing chamber when the shot cycle is completed.

15 Claims, 12 Drawing Figures

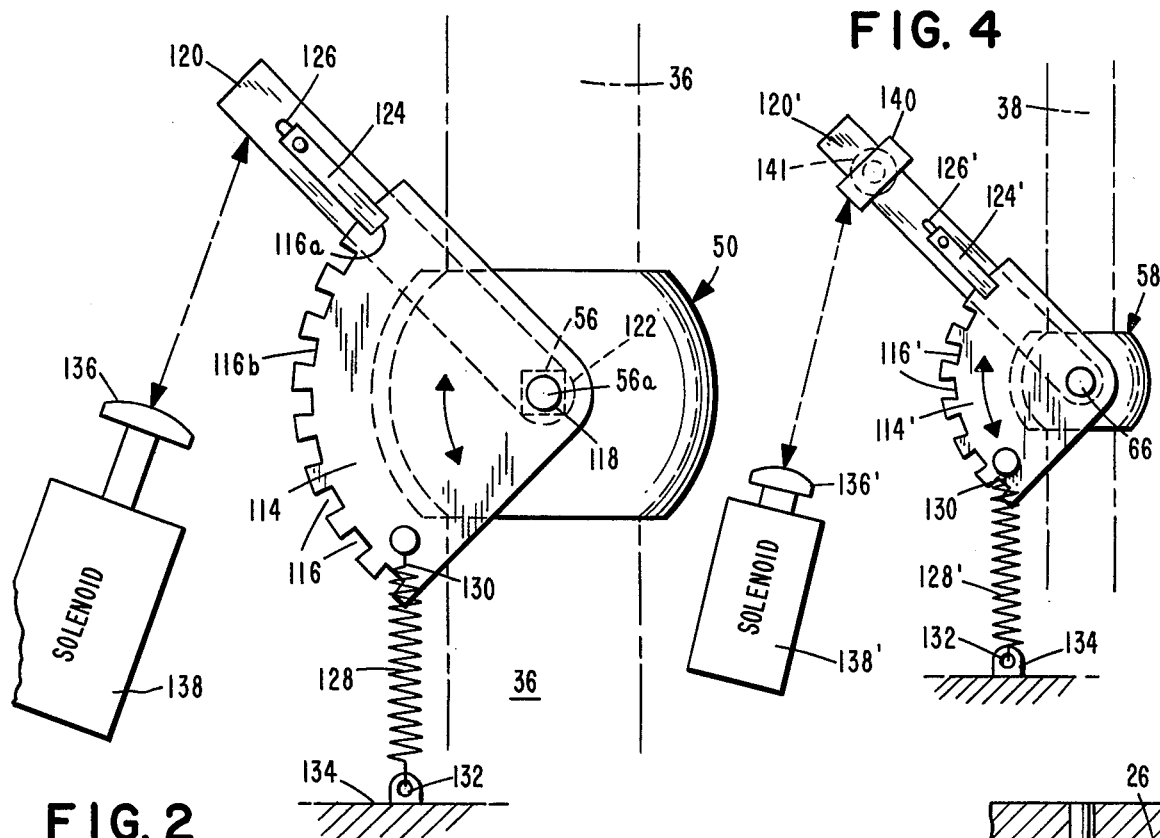
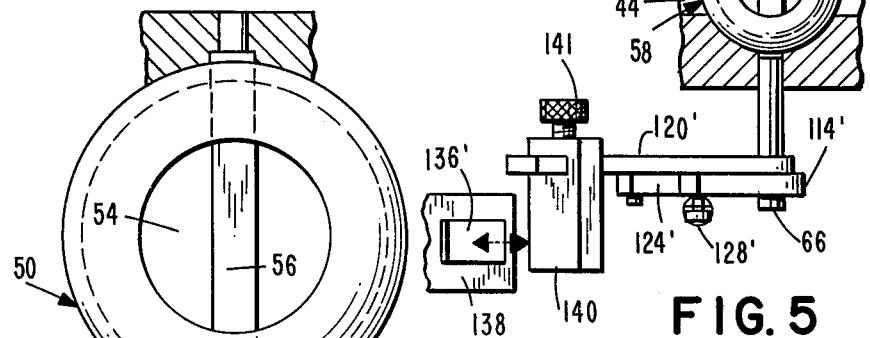
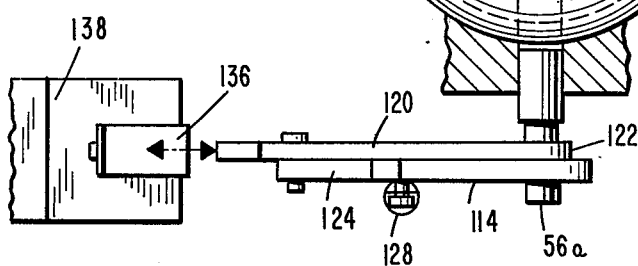

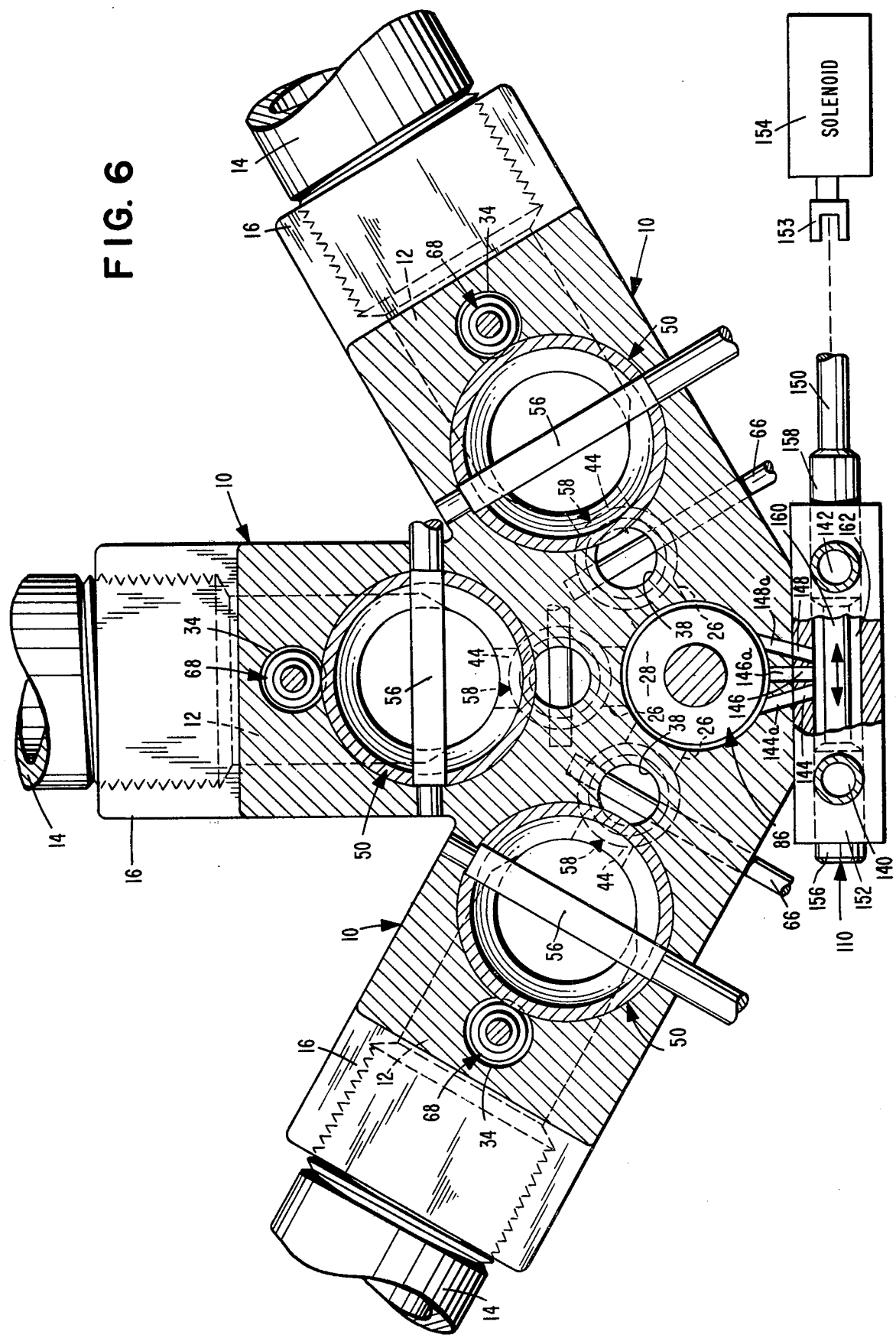

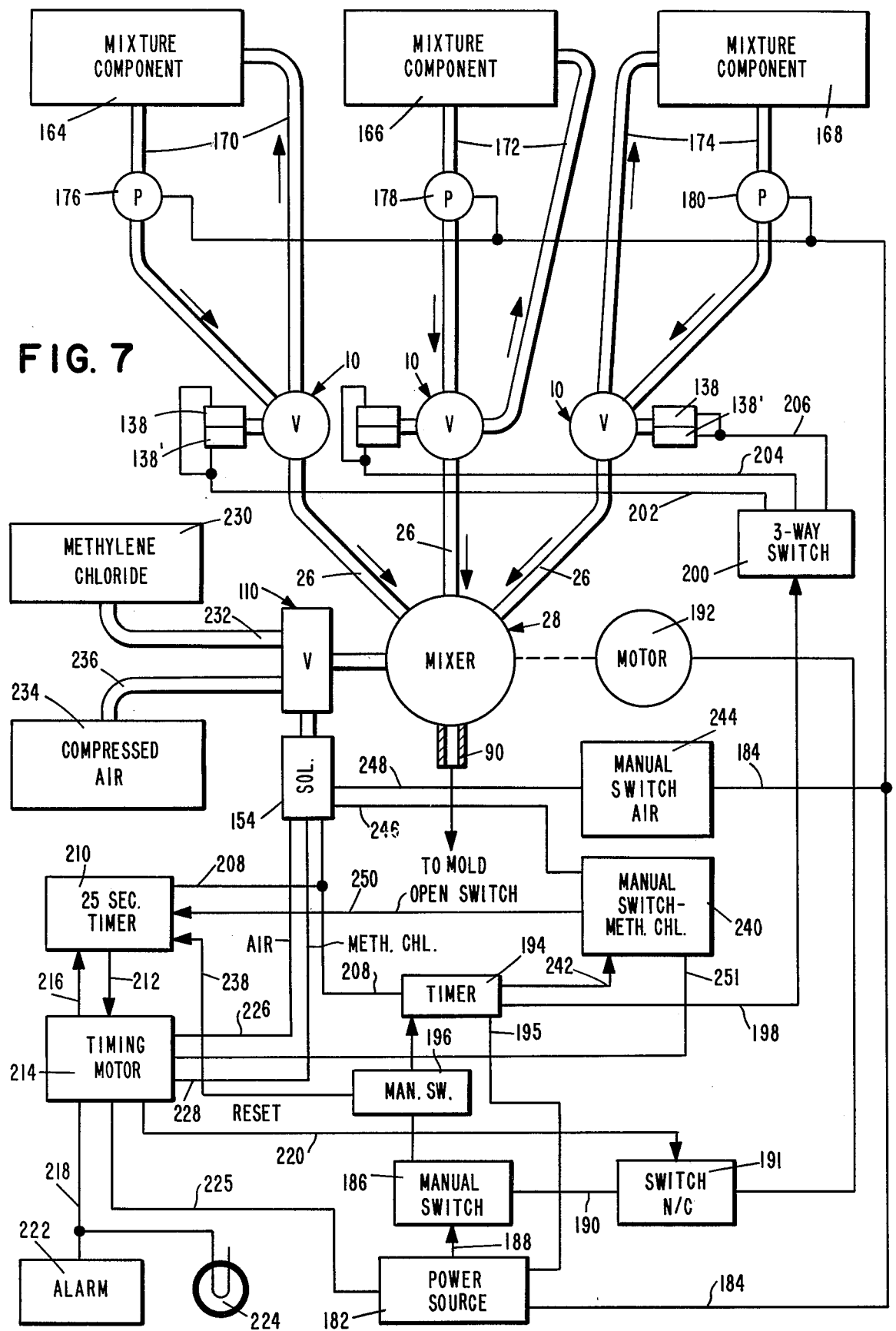

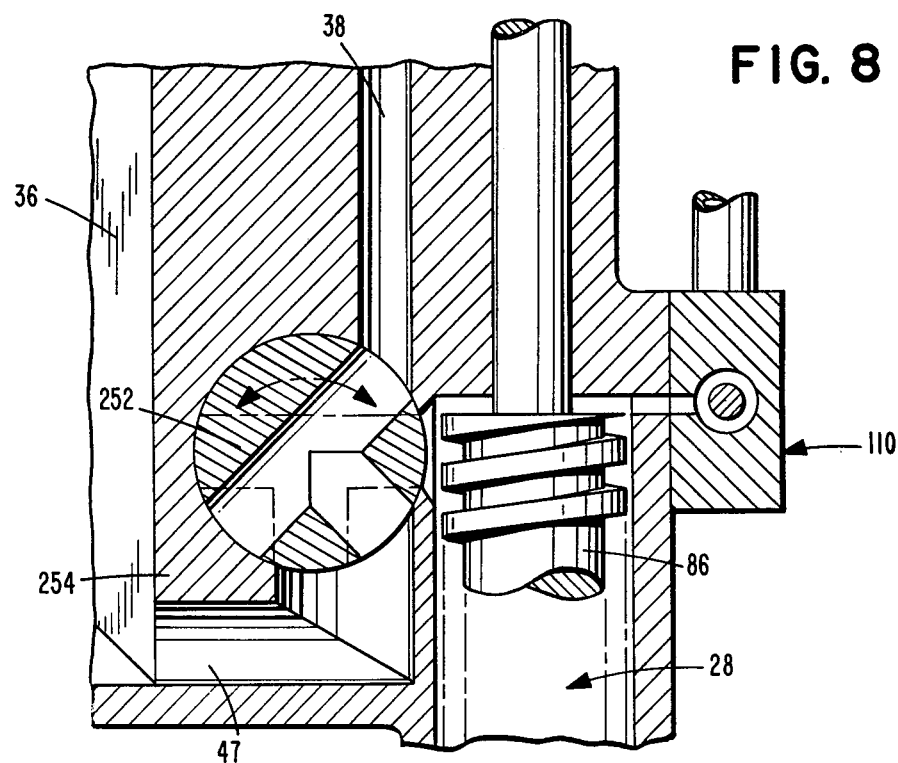
FIG. 8
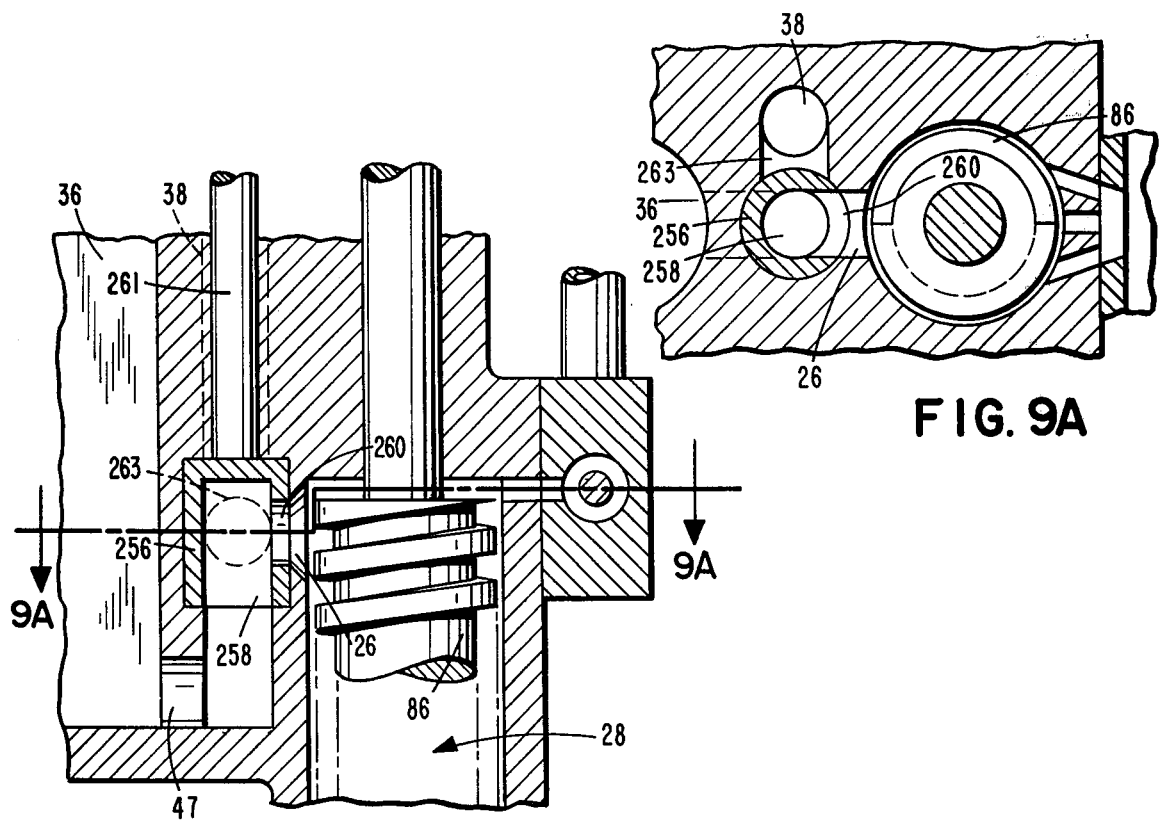
FIG. 9A
FIG. 9

FLUID METERING, MIXING AND DISPENSING MACHINE

BACKGROUND OF THE INVENTION

1. Field of the Invention

This invention relates to a machine for metering, mixing and dispensing fluids and, more particularly, to a valve apparatus and electrical control circuitry to control the flow of components of polyurethane, elastomers, or other products into the mixing chamber.

2. Description of the Prior Art

Machines for metering, mixing and dispensing polyurethane are well-known and are used in conjunction with an assembly line for filling a plurality of molds. Each of the molds on the assembly line periodically moves under a dispensing nozzle of a machine to receive a predetermined quantity of polyurethane. A machine operator views the assembly line and controls the machine to dispense the polyurethane into each mold.

Conventional machines for metering, mixing and dispensing polyurethane usually work on a two cycle operation. In one cycle, known as a recirculation cycle, two components which, when combined, form the polyurethane are recirculated about the machine in separate channels. In the second cycle, known as the output or shot cycle, the two components are metered into a mixing chamber where they are mixed to form the polyurethane which is then dispensed into the mold. The operator switches the machine from the recirculation cycle to the shot cycle when a mold moves under the dispensing nozzle.

The conventional machines employ valves which are either fully opened or closed to direct respective components into or away from the mixing chamber. During the recirculation cycle, the recirculation channels are open and the valves closed to the mixing chamber to prevent components from entering the chamber. When a mold is in position to receive the polyurethane, the machine is placed in the shot cycle in which the recirculation channels are closed and the valves turned to the open position to permit the components to enter the mixing chamber.

It is important to meter predetermined quantities of components, mix them and dispense the polyurethane from the mixing chamber within a predetermined period of time. Otherwise, the polyurethane formed in the mixing chamber will foam and clog the chamber as well as the valves. For example, a shot cycle may last about 30 seconds during which time the components will be continuously directed into the mixing chamber, mixed and then dispensed to fill one mold.

Conventionally, the components flow into the mixing chamber through a relatively small aperture of about ¼". Therefore, a relatively high pressure is needed in the machine to force the required amounts of components into the mixing chamber during the shot cycle. Consequently, conventional machines are constantly operated under steady heat pressure conditions to have available the high pressure needed during the shot cycle. These machines are constantly operating under steady high pressure conditions of about, for example 150-200 psi during both the recirculation cycle and the shot cycle.

A disadvantage with conventional machines is that they continuously operate under steady high pressure conditions though such conditions are required only for the shot cycle. As a result, electric motors driving pumps for the components must be capable of high performance and use large amounts of electric power at all times. Such machines, therefore, waste a great amount of energy since the high pressure needed for filling a mold with polyurethane is required only during the shot cycle. Moreover, even if the assembly line is shut down the machines must continuously recirculate the components forming the polyurethane to avoid clogging of the machines. Since these machines continue to recirculate the components under such high pressure conditions, a large amount of electrical energy is wasted.

Furthermore, because the conventional machines operate under steady high pressure a relatively long period (about 15 seconds) elapses between shot cycles or pours into the molds. This is possibly because the valves controlling the flow direction of the components cannot move quickly between the open and closed positions in a high pressure environment. Therefore, molds must travel along the assembly line at a reduced speed, and the number of molds filled per unit of time is reduced accordingly.

In addition, as indicated above, the valves in conventional machines are in either the fully closed or fully opened position. Consequently, the flow into the mixing chamber cannot be calibrated to vary the amount of components entering the mixing chamber for a given shot cycle. Also, the duration of the shot cycle in such machines cannot be varied without varying the quantity of components metered into the mixing chamber.

SUMMARY OF THE INVENTION

It is an object of the present invention to provide a novel machine for metering, mixing and dispensing fluids.

It is another object of the present invention to provide a novel machine for metering, mixing and dispensing polyurethane.

It is a further object of the present invention to provide apparatus for varying the pressure under which the machine operates.

It is a still further object of the present invention to provide a novel valve assembly for controlling the flow direction of components of polyurethane in the machine.

It is yet another object of the present invention to provide novel electrical control circuitry for controlling the recirculation and shot cycles of the dispensing machine, as well as to purge or clean the mixing chamber when required.

It is another object of the present invention to provide a dispensing machine which operates faster than conventional machines and at a reduced cost.

The foregoing and other objects of the present invention are obtained by means of a fluid dispensing machine using a first valve assembly having structure to divide the flow of a fluid entering the assembly from a source between one output leading back to the source and another output leading to a mixing chamber, the amount of fluid flowing to either output being adjustable. The fluid entering the valve assembly may be channeled into one, two or more channels. Within each channel is an adjustable, for example rotatable, valve having holes through which the fluid can flow and be returned to the fluid source. One of the channels additionally has an aperture or output through which fluid can flow into the mixing chamber. The degree of opening of this aperture is controlled by the valve in this one channel and when this valve is rotated fluid is directed into the mixing chamber. The degree of rotation of such valves is preset by a calibration device for each of the valves. Sources of purging material are coupled to the mixing chamber through a second valve assembly to purge the mixing chamber of fluid, as may be required. Each of the valves in the two valve assemblies is operated by a solenoid whose timing is controlled by an electrical timing circuit.

When more than one channel is used, during the recirculation cycle, all valves in the first assembly are fully open to return all the divided fluid back to the fluid source, with the aperture leading to the mixing chamber being closed. For a given shot cycle, the one valve controlling this aperture is rotated a predetermined distance to direct, for example, all of the fluid in its channel to the mixing chamber. At this time the machine is operating under very low pressure conditions. It it is predetermined that a greater quantity of fluid must enter the mixing chamber within the given shot cycle, then the other valve (or valves) of the first assembly is rotated a predetermined amount to at least partially close its channel, thereby creating a back pressure to increase the pressure in the machine and force more fluid through the one valve and into the mixing chamber during such shot cycle. A valve assembly with only one valve may be used when a relatively smaller quantity of fluid is required in the mixing chamber and this quantity is controlled merely by varying the degree of rotation of the valve.

After the shot cycle, when the valves in the first valve assembly are returned to their fully open position, the valve in the second valve assembly is controlled to supply purging material to the mixing chamber for a predetermined period.

BRIEF DESCRIPTION OF THE DRAWINGS

FIG. 2 is a schematic side elevational view of a calibration system for one ball valve used in the valve assembly of FIG. 1.

FIG. 3 illustrates a top plan view of the calibration system and ball valve of FIG. 2.

FIG. 4 shows a schematic side elevational view of another calibration system for another ball valve used in the valve assembly of FIG. 1.

FIG. 5 is a top plan view of the calibration system and ball valve of FIG. 4.

FIG. 6 is a horizontal sectional view showing three of the valve assemblies of FIG. 1 in juxtaposition with a common mixing chamber.

FIG. 7 is a diagrammatic showing of the electrical control circuit of the present invention.

FIGS. 8, 9 and 10 are vertical sections of alternative embodiments, respectively, of the ball valve of FIG. 4 and FIG. 9A is a section along lines 9A—9A of FIG. 9.

DETAILED DESCRIPTION OF THE DRAWINGS

The present invention will be described with respect to a machine for metering, mixing and dispensing polyurethane comprising a plurality of components. However, it is to be appreciated that the invention is applicable to the metering, mixing and dispensing of other fluids.

Figure 1:
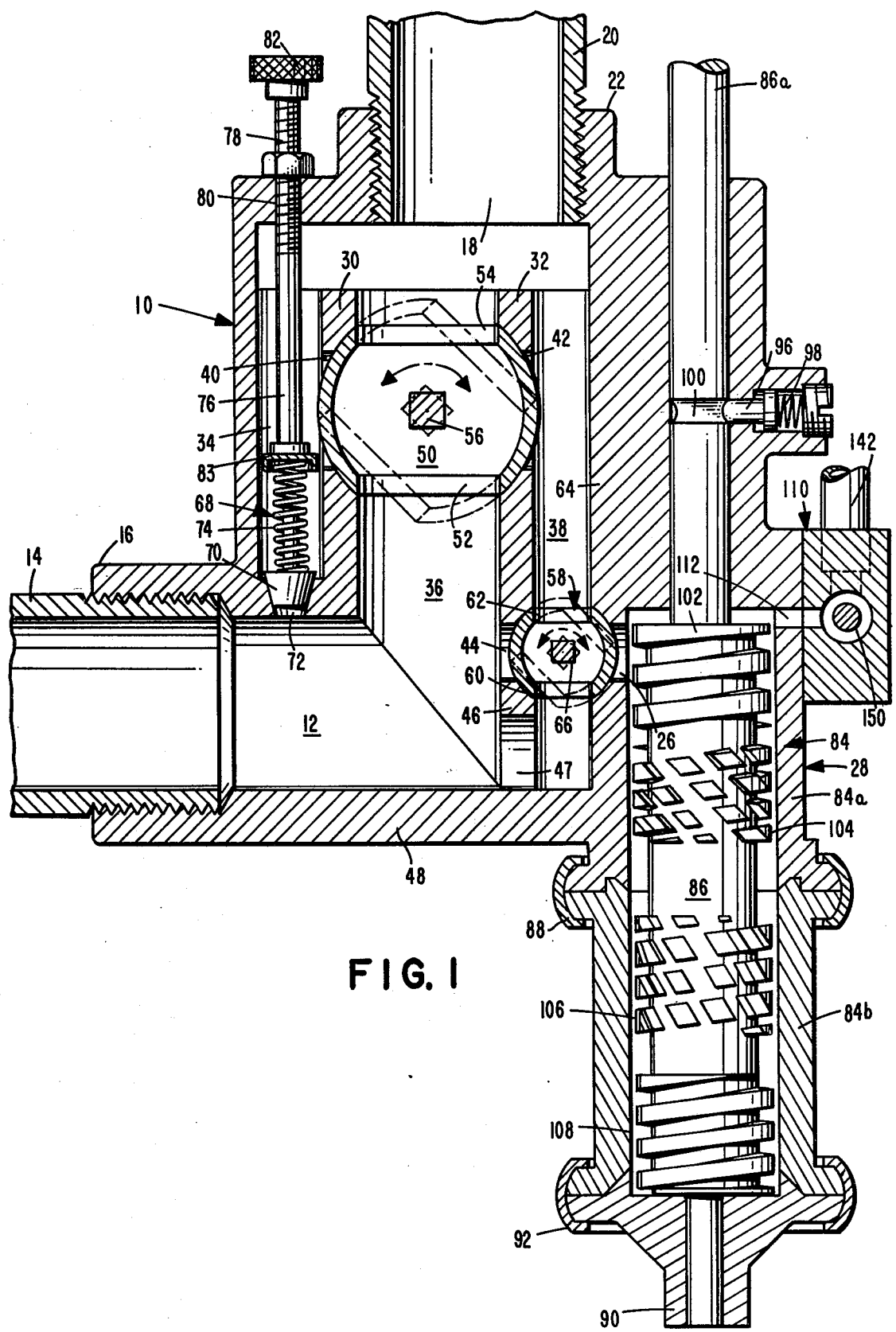
FIG. 1 is a vertical sectional view of a mixing chamber and a valve assembly of the present invention through which a component of polyurethane flows.

FIG. 1 discloses a valve assembly for introducing one of the components of the polyurethane into a mixing chamber. A valve assembly 10 for directing the flow of a component of polyurethane during a recirculation cycle and a shot cycle has an entry port 12 which receives the component through a coupling 14 which is threaded to an input end 16 of the assembly. Valve assembly 10 has a return port 18 through which the component exits the valve assembly via a coupling 20 threaded to the discharge end 22. Couplings 14 and 20 are connected via conduits to a source of mixture component (See FIG. 7) for recirculating the component. Valve assembly 10 also has third port 26 through which the component may flow into a mixing chamber 28.

A pair of spaced-apart partitions 30, 32 within the valve assembly 10 form three channels 34, 36 and 38, respectively, in which the component may flow to the return port 18. Partitions 30, 32, have axially aligned apertures 40, 42, respectively, and partition 32 has another aperture 44 axially aligned with port 26. The lower end 46 of partition 32 is spaced from the lower wall 48 of valve assembly 10 to enable the component to flow into channel 38 through a hole 47.

A first hollow ball valve 50 having holes 52, 54 through which the component may flow is located within the channel 36 and extends within apertures 40, 42 between partitions 30, 32. The ball valve 50 is connected at its center to a shaft 56 which can rotate the ball valve 50 about its axis within channel 36.

A second ball valve 58 has holes 60, 62 through which the component may flow and extends within apertures 44, 26 between partition 32 and a side wall 64 forming channel 38. Ball valve 58 also is connected at its center to a shaft 66 which can rotate the ball valve 58 about its axis within channel 38.

An adjustable relief valve 68 is connected within channel 34 to relieve the pressure within the valve assembly 10 should the component exceed a predetermined pressure. Relief valve 68 includes a plug 70 which closes an aperture 72 near the entry port 12. A spring 74 is connected at one end to the plug 70 and at its other end to one end of a shaft 76, the spring 74 biasing the plug 70 to close the aperture 72. The other end of shaft 76 has screw threads 78 to enable the shaft to be threaded within threaded aperture 80 on the top of valve assembly 10. A thumb screw 82 is connected to the top of shaft 76 to screw the shaft 76 a predetermined distance into channel 34, thereby adjusting the tension on spring 74, which is rotatably connected to shaft 76 via a coupling 83 and, hence, the pressure with which plug 70 closes aperture 72.

The mixing chamber 28, which receives the component through aperture 26, includes a cylindrical housing 84 for a rotatable shaft 86. Housing 84 includes an upper wall 84a which is an integral part of the valve assembly 10 and a cylindrical lower wall 84b which is coupled to the upper wall 84a via a coupling 88. The lower wall 84b is also coupled to a discharge nozzle 90 via another coupling 92, through which nozzle polyurethane may be discharged to a mold on an assembly line.

Shaft 86 has a relatively small diameter extension 86a which extends through the wall 64 of valve assembly 10 and is coupled to a motor 192 (see FIG. 7) for rotatably driving the shaft. A spring loaded pin 96 coupled to a spring 98 is biased within a narrow track 100 on the periphery of extension 86a to help support the shaft 86 axially within mixing chamber 28 and to enable fast removal of the shaft from the mixing chamber, as will be described.

Shaft 86 has four gears 102, 104, 106 and 108 which rotate with the shaft and have threads which run parallel to one another. Gear 102 is a suction gear and provides suction at the aperture 26 to aid in drawing the component into the mixing chamber 28. Gears 104, 106 enable mixing of several components entering the mixing chamber to form the polyurethane. Gear 108 is a pressure gear which, together with gears 104, 106, aids in discharging the polyurethane from the mixing chamber 28 and into the discharge nozzle 90.

It is important at times to purge or cleanse the mixing chamber 28 of polyurethane. Therefore, another valve assembly 110, described in more detail below, is connected to the valve assembly 10 and directs purging material such as methylene chloride or compressed gas from sources 230 and 234, respectively (see FIG. 7) into the mixing chamber 28 and towards aperture 26 through an aperture 112.

The sum of the areas of the channels in a valve assembly into which a component flows should be equal or substantially equal to the area of the entry port or the return port, with these latter two areas being equal. In this way, with the ball valves fully open to return all of the component to its source there will be no pressure build-up in the assembly. Thus, in FIG. 1 the sum of the areas of channels 36 and 38 should be equal or substantially equal to the area of the entry port and to the area of the return port 18.

The operation of the apparatus shown in FIG. 1 is as follows. During a recirculation cycle, when no component flows into the mixing chamber 28, the ball valves 50 and 58 are in the position as illustrated by solid lines in FIG. 1, i.e., ball valve 50 is fully opened within channel 36 thereby closing apertures 40 and 42 and ball valve 58 is fully opened within channel 38, thereby closing ports 44 and 26 to prevent the component from flowing into the mixing chamber 28. Consequently, during the recirculation cycle, the component will enter the valve assembly 10 through coupling 14 and then be divided into two flows with the aid of partition 32. The divided component will then flow in channels 36, 38, through respective ball valves 50, 58 to the port 18 and return to the source of component through coupling 20.

During the recirculation cycle, the mixing chamber 28 and aperture 26 may have to be purged of polyurethane which was formed during a previous shot cycle. Therefore, if a purge is needed, valve assembly 110 will, at this time, be opened to direct purging material from a source to the aperture 26 whereby the purging material will be reflected off the side of ball valve 58 within aperture 26 to the other parts of the mixing chamber 28. The purging material will cleanse the aperture 26 and the mixing chamber 28 of polyurethane and then flow through the discharge nozzle 90.

For the shot cycle, the component is directed into the mixing chamber through the aperture 26. The ball valve 58 is rotated a predetermined degree, for example to open partially aperture 26, as shown by dotted lines in FIG. 1. The component flowing within valve assembly 10 is divided and flows in channels 36 and 38. A part of the component flowing in channel 38 is deflected off a wall of the ball valve 58 and through the aperture 26 into the mixing chamber 28. The other part of the component flowing in the channel 38 will flow through the ball valve 58, without being deflected, to the return port 18.

During a shot cycle of a preset period, a predetermined quantity of component must flow into the mixing chamber 28 to form the required amount of polyurethane. To accomplish this, one or both of the ball valves 50, 58 will be rotated about their axes a preset degree resulting in a flow of component into the mixing chamber 28. The amount of material required to be drawn into the mixing chamber 28 for a given shot cycle will determine whether one or both of the ball valves are rotated and the degree of rotation of the valves.

If the required amount of the component can flow into mixing chamber 28 during the shot cycle with only ball valve 58 partially rotated, as shown by dotted lines in FIG. 1, then ball valve 50 will remain in the position shown in full lines in FIG. 1. Thus, all of the component flowing in channel 36 will flow directly through ball valve 50 to the return port 18 without requiring a pressure increase because the component is divided in valve assembly 10.

As indicated previously, a feature of the present invention is that the polyurethane metering, mixing and dispensing machine operates at very low pressures of about 0–2 psi to raise the component from the lower entry port 12 to the higher return port 18 and, yet, is capable of providing a required amount of component in the mixing chamber for a given shot cycle. However, there may be required a quantity of component in the mixing chamber 28 such that under these low pressure conditions and with the ball valve 58 turned 90° from the position shown in full lines in FIG. 1, an insufficient amount of component will flow into the mixing chamber. It will be appreciated that with the ball valve 58 turned 90°, channel 38 will be closed and a portion of the component entering port 12 will flow directly through aperture 44, ball valve 58 and aperture 26 into the mixing chamber 28. The present invention has the advantage of increasing the pressure in the valve assembly 10 when such greater quantity of component is needed to force more of the component to flow through the 90° rotated ball valve 58 during the given shot cycle and into the mixing chamber 28 without changing the amount of fluid entering the valve. Such increased pressure is provided by also rotating ball valve 50 a preset distance about its axis to close partially channel 36 as shown by dotted lines in FIG. 1. As a result, a back pressure will be produced on a portion of the component flowing in the channel 36 forcing more of the component through aperture 44, ball valve 58, aperture 26 and into the mixing chamber 28. As will be appreciated, the amount of back pressure generated by ball valve 50 will depend on the degree of rotation of this ball valve. As the back pressure increases, more component will flow into the mixing chamber 28 for a given shot cycle.

During the shot cycle, valve assembly 110 will be closed to prevent purging material from entering the mixing chamber 28. The motor driving extension 86a will be rotated thereby rotating the shaft 86 to mix the component flowing in through aperture 26 with other components which are also introduced into the mixing chamber 28 through other valve assemblies identical to valve assembly 10, as will be described more fully below. The rotation of the gear 102 will provide suction to assist in drawing the component into the mixing chamber 28. This is particularly advantageous during the period of operation when no back pressure is produced and the machine is operating under very low pressure conditions. The component will then be mixed with other components by mixing gears 104, 106, and gear 108 together with gears 104, 106 will provide pressure to assist in forcing the formed polyurethane through discharge nozzle 90.

FIGS. 2, 3 illustrate the apparatus for enabling ball valve 50 to rotate a preset distance about its axis within channel 36 and FIGS. 4, 5 show the apparatus for enabling ball valve 58 to rotate about its axis a preset distance within channel 38. As shown in FIGS. 2 and 3, a sector member 114 having a plurality of notches 116 on the arcuate side is fixed to a square extension 56a of shaft 56 which extends through an aperture 118 of the member 114. A lever 120 is rotatably connected at one end 122 to the square extension 56a of shaft 56 to rotate with respect to the shaft. Lever 120 includes a locking trigger 124 slidable within an elongated slot 126 to lock the trigger in one of the notches 116.

A spring 128 is connected at one end 130 to the member 114 and at the other end 132 to a fixed support bracket 134. Spring 128 is designed to bias the member 114 and ball valve 50 to an equilibrium position in which the ball valve 50 is in its open position as shown in full lines in FIG. 1 and in FIG. 2 to allow all of the component in channel 36 to pass to the return port 18. A movable core 136 of a solenoid 138 is positioned to move into contact with the outer end of lever 120 to rotate the lever, the member 114 to which the lever is locked, and hence, the ball valve 50. Alternatively, in lieu of spring 128 another solenoid type mechanism may be activated to return member 114 to the position in which ball valve 50 is open as shown by full lines in FIG. 1.

The degree of rotation of the ball valve 50 is determined by the particular position of the lever 120 with respect to the member 114. When energized, solenoid 138 will move core 136 a predetermined distance out of the solenoid to contact the outer end of lever 120. In FIG. 2, lever 120 is locked to sector member 114 at a notch 116a. In this position core 136 will just reach the outer end of lever 120 and will not rotate the member 114 and ball valve 50. If lever 120 were reset or repositioned to be locked at notch 116b, then upon energization of solenoid 138, core 136 will move lever 120 and hence rotate ball valve 50 a preset distance as determined by the relative position of lever 120 with respect to member 114. When solenoid 138 is de-energized, the core 136 is withdrawn from contact with the lever into the solenoid 138 and spring 128 rotates the disc 114 to the equilibrium position whereby ball valve 50 is fully opened within the channel 36.

FIGS. 4 and 5 show elements similar to those of FIGS. 2-3 for moving ball valve 58. The similar structure is illustrated with the same reference numerals having a prime, these elements differing with respect to their size to account for the ball valve 58 which is smaller than ball valve 50. Lever 120' also has a fine adjustment collar 140 which is slidble a small distance along the length of the lever. A thumb screw 141 locks the collar 140 to lever 120' after fine adjustment is made. With this structure, the position of locking trigger 124' in one of the particular teeth 116' will provide a course adjustment for the degree of rotation of the ball valve 58, while the position of collar 140 along lever 120' provides the fine adjustment to the degree of rotation of ball valve 58. The movable core 136' of solenoid 138' is positioned to contact the collar 140. It will be appreciated that if collar 140 were positioned towards the outer end of lever 120' the latter will be moved a shorter distance than if collar 140 were positioned closer in towards the axis of ball valve 58. Alternatively, lever 120 also may be provided with a fine adjustment collar such as collar 140.

FIG. 6 illustrates a multi-component system for introducing two or more components into a common mixing chamber to form polyurethane. The common mixing chamber 28 can receive components from each of three separate valve assemblies 10, each of which is the same as that shown in FIG. 1. Depending on which two or more of the valve assemblies 10 are selected to open the corresponding aperture 26 during the shot cycle, two or more components may be introduced into the common mixing chamber to form the polyurethane. With the apparatus of FIG. 6, it is possible to provide a two-system polyurethane metering, mixing and dispensing machine in which two kinds of polyurethane may be made, or a single system machine in which one kind of polyurethane is formed of three components. For example, each of three valve assemblies 10 may be connected to separate sources having different components. The components flowing in the left and center valve assemblies 10 as shown in FIG. 6 may control two components which form one type of polyurethane, and the right hand valve assembly 10 may control a third type of component which, with the component controlled by the center valve assembly, may form a second type of polyurethane. Alternatively, all three components may be simultaneously mixed in common mixing chamber 28 to form another type of polyurethane.

FIG. 6 also shows in more detail a solenoid operated valve assembly 110 for introducing purging material into the mixing chamber 28. Valve assembly 110 includes two entry ports 140, 142 which are coupled, respectively, to sources of methylene chloride and compressed air. Valve assembly 110 also includes three output ports 144, 146 and 148 which direct the purging material into mixing chamber 28 towards the three respective ball valves 58 via conduits 144a, 146a, 148a, respectively. A slide member 150 slides within the housing 152 of the valve assembly 110 and is movable therein by a core 153 mechanically coupled to member 150 and operated by a solenoid 154. Slide member 150 includes two relatively large diameter parts 156, 158 which are substantially equal to the bore of housing 152 to close entry ports 140, 142 and a small diameter part 160 which forms a chamber 162 within the housing.

As shown in FIG. 6, slide member 150 is in a position in which entry ports 140, 142 are closed to prevent purging material from entering the mixing chamber 28. When it is necessary to purge mixing chamber 28, solenoid 154 is operated to cause slide member 150 to slide to the left as viewed in FIG. 6 to place part 160 in front of entry port 140 thereby opening the entry port and enabling methylene chloride to flow through chamber 162 to output ports 144, 146, 148 and into the mixing chamber 28. At this time, entry port 142 will be closed by part 158 to prevent air from entering the mixing chamber. After the methylene chloride purge is completed, the solenoid 154 may be operated to slide the member 150 to the right to open entry port 142 and close entry port 140. Compressed air will then enter chamber 162 and flow into mixing chamber through output ports 144, 146, 148. When the air purge is complete the solenoid is energized to move the slide member 150 to its initial position as shown in FIG. 6 to close both entry ports 140, 142.

FIG. 7 illustrates schematically the electrical control circuit and polyurethane component flow system of the present invention. As shown, sources 164, 166 and 168 for three separate components of polyurethane are circulated through respective valve assemblies 10 via conduits 170, 172, 174 with the use of pumps 176, 178 and 180. The valve assemblies 10 are shown in FIG. 7 as being substantially spaced from the mixing chamber 28 for ease of illustration; however, it will be appreciated that they are interconnected with the chamber 28 through ports 26 shown in FIG. 1 since the valve assemblies 10 and mixing chamber 28 are integral with one another, as described above.

A power source 182 is coupled to pumps 176, 178, 180 via line 184 to energize the pumps, thereby providing the flow of the components. A manual switch 186 is coupled to the power source 182 via line 188 and has an output over line 190 through normally closed switch 191 to energize motor 192 which rotates the mixing shaft 86 in mixing chamber 28. Manual switch 186 also couples power from source 182 to an adjustable timer 194 through a manual switch 196 having a normally closed and a normally open contact (not shown), the timer being used to set the time that valve assemblies 10 are operated to direct components into the mixing chamber 28. Timer 94 is connectable directly to power source 182 over line 195 via a switch (not shown) in this timer, as will be described. Timer 194 is connected through line 198 to a selector switch 200, which may be a three way switch, for selecting which two or more of the valve assemblies 10 will be controlled to direct components into the mixing chamber 28. The selector switch 200 has a plurality of output lines 202, 204, 206 each of which is connected to respective solenoids 138, 138' for one of the valve assemblies 10. Timer 194 is also coupled to solenoid 154 via line 208 to provide a short duration air purge as will be described.

The output of timer 194 on line 208 is also coupled to a 25-second timer 210 which activates a full automatic purge cycle using both methylene chloride and compressed air, as will be more fully described. The output of timer 210 is coupled via line 212 to a timing motor 214 for controlling the automatic full purge cycle. Timing motor 214 has one output over line 216 to timer 210 to drop out the latter and additional outputs over lines 218, 220 to a buzzer alarm 222 and light alarm 224, and switch 191, respectively. Alarms 222, 224 are activated to warn the operator of the machine that the automatic purge cycle is occurring and the output on line 220 causes the mixing motor 192 to be shut off after the full purge is completed. Timing motor 214 is also connectable to power source 182 over line 225 via a switch (not shown) in this timer, as will be described. Timing motor 214 also is coupled to solenoid 154 via lines 226, and 228 to introduce methylene chloride from source 230 into mixing chamber 28 via conduit 232 and valve assembly 110 and then to introduce compressed air from source 234 into the mixing chamber 28 through conduit 236 and valve assembly 110.

The 25-second timer 210 is also coupled to manual switch 196 through line 238. When manual switches 186 and 196 are closed, the normally closed contact on switch 196 is opened to recycle the timer 210 in preparation for another 25-second period.

The present invention also provides for a manually operated purge cycle in addition to the automatic purge cycle. A manual switch 240 is coupled to timer 194 via line 242 and a manual switch 244 is coupled directly to the power source 182 via line 184. Manual switches 240, 244 are coupled to solenoid 154 via lines 246, 248 respectively, to control the introduction of methylene chloride and compressed air into the mixing chamber 28. Manual switch 240 is coupled to timer 194 to prevent the introduction of methylene chloride into the mixing chamber when the timer is controlling the introduction of the components of the polyurethane into the mixing chamber. Manual switch 240 is also coupled to the 25-second timer 210 via line 250 to open the latter during manual operation, thereby preventing the automatic purge cycle from being activated. Also, timing motor 214 has an output coupled to switch 240 over line 251 to prevent switch 240 from being closed if the automatic purge cycle is activated.

A suitable timer 194 is manufactured by the G & W Eagle Signal Co., Industrial Controls Division, of Davenport, Iowa under Serial No. CT 531 A602. This company also manufactures a timing motor 214, as described in Bulletin #345 in its catalogue entitled Time Control, copyright Eagle Signal 1972. Timer 210 may be a simple relay made by the "Square D" Co. of Park Ridge, Illinois.

The operation of the apparatus of FIG. 7 is as follows. As indicated above, before the assembly line is started to bring the various molds under nozzle 90, the operator of the machine presets levers 120, 120' to enable ball valves 50, 58 to rotate a predetermined distance in accordance with the desired quantity of components required to enter the mixing chamber 28 within a given period of time, as preset in timer 194. The operator also presets the selector switch 200 to couple the two solenoids 138, 138' for, for example, two of the valve assemblies 110 to the power source 182 to control which components will be introduced into the mixing chamber 28. While these presetting operations are carried out by the operator, power source 182 is on, thereby activating pumps 176, 178, 180 which enable the components from sources 164, 166, 168 to be recirculated, i.e., the machine is in the recirculation cycle. The operator is now ready to control the machine to fill the molds as they move down the assembly line.

The operator closes manual switch 186 to energize motor 192 thereby starting the rotation of the mixing shaft 86. He then closes manual switch 196 a short time to close its normally open contact to activate timer 194 which closes the switch (not shown) in timer 194 to connect the timer to the power source 182 over line 195. Also, the normally closed contact in switch 196 is opened to reset timer 210.

First, the timer 194 provides an output on line 198 to the selector switch 200 thereby activating the selected two valve assemblies 10 via respective solenoids 138, 138'. The ball valves 50, 58 are now rotated the predetermined amount as set by the operator, and remain in this position for the present time provided by timer 194 to enable the components to flow into the mixing chamber 28 to form the polyurethane. After this preset time, the mold beneath discharge nozzle 90 is filled with the required amount of polyurethane and it is necessary to provide a short duration air purge of the mixing chamber 28. Consequently, timer 194 now switches the power source 182 from line 198 to line 208 to de-energize solenoids 138, 138' and energize the solenoid 154 to enable compressed air to purge the mixing chamber for a duration of about 30 milliseconds. Since there is no output on line 198, the ball valves 50, 58 in each selected valve assembly 10 will return to their initial position in which the components are recirculated and not allowed to flow into the mixing chamber 28.

If the next mold on the assembly line does not move under the discharge nozzle 90 within about 25 seconds from the end of the previous shot cycle, so that a new shot cycle may commence, any polyurethane formed from the previous shot cycle will foam and clog the mixing chamber. If this 25-second period elapses before the new mold is in position, then a more complete purge cycle must be activated before continuing with a new shot cycle. If the new mold is in position within the 25-second period then the full purge cycle need not occur.

Therefore, the output on line 208 which causes the commencement of the short 30-millisecond purge, also activates 25-second timer 210. If the operator of the machine determines that the next mold will move under the discharge nozzle 90 within 25 seconds then he merely presses manual switch 196 again thereby beginning a new shot cycle by the output on line 198 and resetting timer 210. The motor 192 continues to be energized during this time since a stop motor signal over line 220 has not been generated.

If the operator determines that the 25-second period will elapse before another mold is in place under discharge nozzle 90, then he merely allows the 25-second timer 210 to time out. After 25 seconds, therefore, timing motor 214 is energized to begin the automatic purge cycle and is connected via the switch (not shown) in this timing motor to power source 182 over line 225. Timing motor 214 first provides an output over line 216 to drop out the 25-second timer 210 and an output on line 251 to prevent switch 240 from being closed for manual purge. Then, timing motor 214 provides an output over line 218 to activate buzzer alarm 222 and light alarm 224 to give an audible and visual warning that the purge cycle is occurring.

About three seconds after warning alarms are activated, timing motor 214 provides an output over line 226 to energize solenoid 154 for a predetermined period of time to introduce methylene chloride into the mixing chamber from source 230. The purge with methylene chloride occurs for about one second which is sufficient to clean the ball valve 58 in each of the selected valve assemblies 10 and mixing chamber 28. After the methylene chloride purge, timing motor 214 ceases to provide a signal on line 226 and provides an output over line 228 for about one and a half seconds to purge the mixing chamber 28 and each ball valve 58 with compressed air. Finally, after the air purge, timing motor 214 provides an output over line 220 to open normally closed switch 191 and de-energize motor 192. As a result, only the pumps 176, 178 and 180 continue to operate to recirculate the components. The operator may then commence a new shot cycle by closing manual switch 196 at an appropriate time.

At various times the operator may desire to operate manually the full purge cycle rather than rely on the automatic purge cycle present within timing motor 214. Therefore, after the shot cycle and the short 30-millisecond air purge provided as a result of the operation of timer 194, the operator can manually close switch 240 which opens the 25-second timer 210. The closing of manual switch 240 also activates solenoid 154 to position the sliding member 150 to introduce methylene chloride into the mixing chamber. As a safety feature, solenoid 154 is not operated on closure of switch 240 until timer 194 provides an output over line 242 (line 198 now being opened) to prevent methylene chloride from entering the mixing chamber at the same time that components are entering the mixing chamber. Until reset by closure of switch 196, timer 194 maintains its output on line 242, thereby enabling the operator to purge with methylene chloride for as long as switch 240 is closed. After the operator has purged the mixing chamber 28 with methylene chloride he may then open the switch 240 and close switch 244 to activate solenoid 154 and provide compressed air into the mixing chamber. The operator also may open switch 191 to stop motor 192.

FIG. 8 illustrates another embodiment of the present invention in which a three-way ball valve 252 is used in lieu of ball valve 58 shown in FIG. 1. As is illustrated, ball valve 252 is closely coupled to the mixing chamber 28 to direct components forming the polyurethane into the mixing chamber and/or towards the return port 18 depending on the degree of rotation of the ball valve 252. The component enters the valve assembly and is divided into two channels 36, 38 by a partition 254. The bal valve 252 may be rotated about its axis a predetermined amount through the use of a solenoid and lever arrangement as shown in FIGS. 4 and 5. In the position shown in FIG. 8, the ball valve 252 will direct all of the component flowing into it towards the channel 38. Depending on the degree of rotation of the ball valve 252, part or all of this component may be directed into the mixing chamber 28, as will be readily apparent.

FIGS. 9 and 9A illustrate another alternative embodiment in which a hollow pipe 256 is used in place of the ball valve 58 shown in FIG. 1. In this alternative embodiment the pipe 256 having an open end 258 for receiving the component and a hole 260 at the other end out of which the component may flow is positioned to direct the component either into the mixing chamber 28 or to the return port 18. Pipe 256 is rotatable a predetermined distance about its axis through the use of a solenoid and lever arrangement coupled to shaft 261, similar to that shown in FIGS. 4 and 5. As indicated in FIG. 9A, the return line or channel 38 is offset from the pipe 256 by a connecting port 263. The component enters the valve assembly and is divided into two channels 36, 38 by a partition 261. Depending on the rotational position of the pipe 256, a part or all of the component flowing in the pipe will be directed into the mixing chamber 28.

Figure 10:
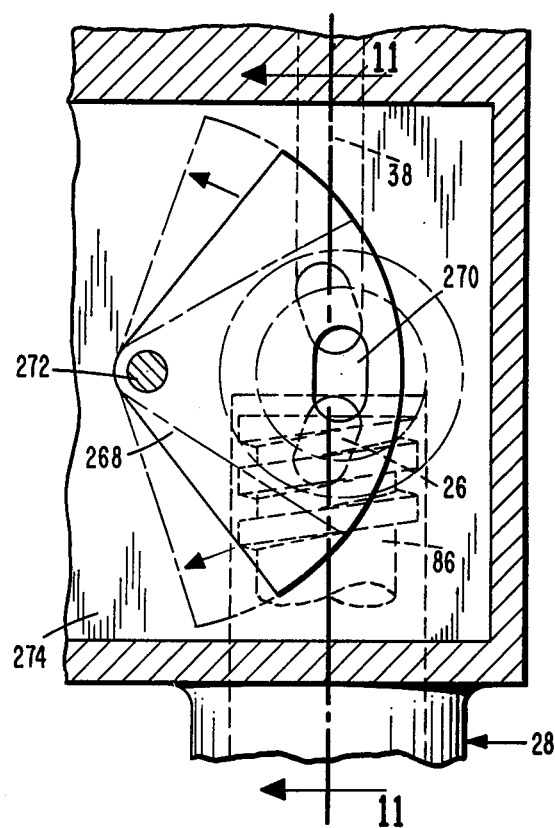
Figure 11:
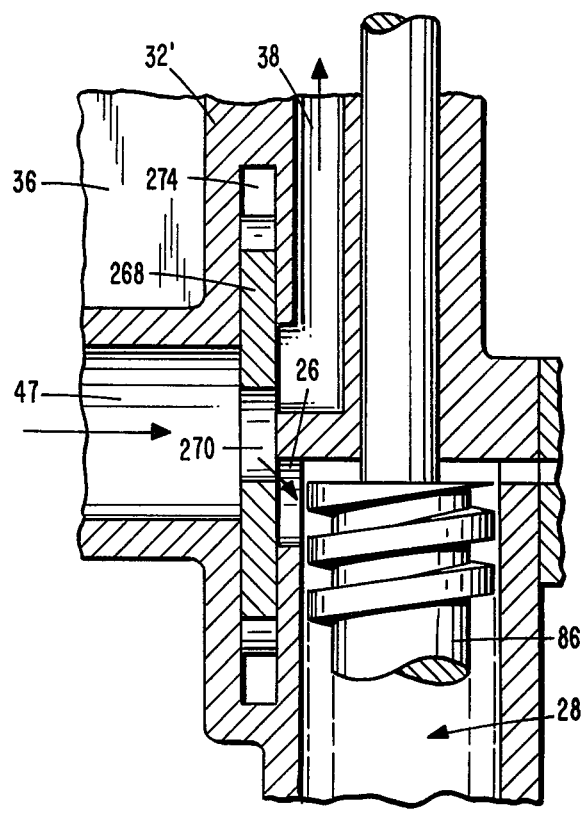
FIG. 11 is a section taken along lines 11—11 of FIG. 10.

FIGS. 10 and 11 illustrate still another alternative embodiment of the present invention in which a disc 268 is used instead of the ball valve 58 shown in FIG. 1. In this embodiment the disc 268 has an oval slot 270 through which the component may flow and is pivotable about a pin 272. The valve of this embodiment is slidably enclosed in a pocket 274 of a wall 32' in place of partition 32 shown in FIG. 1 to divide the flow of components into the valve assembly into two paths. Disc 268 also is adjustable about the pin 272 a predetermined distance with the use of the solenoid and lever arrangement as shown in FIGS. 4 and 5. Again, depending on the position of the slot 270 with respect to the channel 38 and aperture 26 leading into the mixing chamber 28, the part of the component flowing through the slot 270 will be divided between the channel 38 and the aperture 26, or all of this fluid through slot 270 will be directed either to channel 38 or aperture 26.

In still another alternative embodiment a single channel and ball valve may be used to receive a component from an entry port and divide this component between a return port and aperture leading to a mixing chamber. For example, FIG. 1 may be modified to have only a single channel 38 and single ball valve 58 and with an entry port 12 and return port 18 which are equal in area to each other and to the single channel. The division of the component enables an operator to control the quantity of component flowing into the chamber during a given shot cycle and the time of the shot cycle. Thus, if a given amount of component is required in the mixing chamber in a short period this valve may fully open aperture 26, but if the given amount is required over a longer period the valve may only partially open the aperture.

In addition to the advantages described above, the present invention is easy to clean at various times when it is necessary to disassemble the apparatus. Periodically, despite the use of a full purge cycle, the mixing chamber 28 may have to be taken apart and cleaned more fully. This may be readily accomplished by removing the coupling 88 together with the lower wall 84b of the mixing chamber from the valve assembly 10. The mixing shaft 86 then may be removed by exerting a vertical force downward on shaft 86 to cause pin 96 to slide out of track 100 and enable removal of the extension 86a from the bore of wall 64. Easy access is now had to the inside of walls 84a of mixing chamber 28 as well as to the mixing shaft and the removable wall 84b.

While the invention has been described with reference to the structure disclosed herein, it is not confined to the details set forth, but is intended to cover such modifications or changes as may come within the scope of the following claims.

What is claimed is:

1. Apparatus for dispensing a fluid, comprising,
    a housing having an entry port for receiving said fluid from a fluid source, a first output port for returning said fluid to said fluid source and a second output port for dispensing said fluid, the area of said entry port being substantially equal to the cross-sectional area of said first output port;
    a partition having at least one aperture therein positioned within said housing for dividing said fluid into first and second channels, said first channel connecting said entry port directly to said first output port and said second channel connecting said entry port to said first and second output ports via the aperture in said partition, the sum of the cross-sectional area of said first and second channels being substantially equal to the cross-sectional area of said entry port and of said first output port; and
    a valve interposed between the aperture in said partition, said second channel and said second output port for dividing the fluid entering said aperture between said first and second output ports, said valve being adjustable to permit dispensing all or a portion of the fluid flowing through the aperture in said partition to said second output port and the remainder of the fluid flowing through said aperture to said first output port without significantly changing the amount of fluid entering said entry port from said fluid source.

2. Apparatus according to claim 1 wherein a mixing chamber is coupled to said second output port.

3. Apparatus according to claim 1 wherein said valve is a rotatable ball valve.

4. Apparatus according to claim 3 wherein another valve is located within said first channel for controlling the flow of fluid between said entry port and said first output port.

5. Apparatus according to claim 4 wherein said another valve is a rotatable ball valve.

6. A machine for metering, mixing and dispensing a fluid product composed of a plurality of fluid components, comprising,
    a plurality of fluid sources, each storing one of said components;
    a mixing chamber into which said components are metered for mixing the components to form said product and to discharge said product; and
    a plurality of valve assemblies, each including
        a housing having an entry port for receiving one of said fluid components from its fluid source, a first output port for returning said fluid component to its fluid source and a second output port coupled to said mixing chamber for dispensing said fluid component into said chamber, the cross-sectional area of said entry port being substantially equal to the cross-sectional area of said first output port;
        a partition having at least one aperture therein positioned within said housing for dividing said fluid component into first and second channels, said first channel connecting said entry port directly to said first output port and said second channel connecting said entry port to said first and second output ports via the aperture in said partition, the sum of the cross-sectional areas of said first and second channels being substantially equal to the cross-sectional area of said entry port and of said first output port; and
        a valve interposed between the aperture in said partition, said second channel and said second output port for dividing the fluid component entering said aperture between said first and second output ports, said valve being adjustable to permit dispensing all or a portion of the fluid flowing through the aperture in said partition to said second output port and the remainder of the fluid component flowing through said aperture to said first output port without significantly changing the amount of fluid component entering said entry port from said fluid component source.

7. A machine according to claim 6 further including means connected to said valve assemblies for introducing purging material into said mixing chamber.

8. Apparatus according to claim 6 wherein said mixing chamber includes a rotatable shaft having on its outer periphery at one end near the second output ports of said valve assemblies a first gear providing suction for drawing said fluid components into said chamber, at its other end a second gear providing pressure to force said fluid product out of said mixing chamber and a third gear interposed between said first and second gears for mixing said fluid components within said chamber.

9. A machine according to claim 8 wherein said chamber is formed by a first cylindrical wall which is an integral part of said valve assembly means and a second cylindrical wall removably coupled to said first wall.

10. Apparatus according to claim 6 wherein said valve is a rotatable ball valve.

11. Apparatus according to claim 10 wherein another valve is located within said first channel for controlling the flow of fluid components between said entry port and said first output port.

12. A machine according to claim 11 which further comprises adjustment means coupled to each of the valves in said valve assemblies for intermittently directing selected fluid components into said mixing chamber for a given period of time.

13. A machine according to claim 12 which further comprises another adjustment means coupled to said another valve to reduce the flow through said first channel thereby increasing the fluid pressure in said second channel during said given period in accordance with the quantity of the fluid component required to flow into said mixing chamber during said give period.

14. A valve assembly for controlling fluid flow, comprising:
(a) a housing having an entry port for receiving the fluid, a first output port for discharging fluid, and a second output port for discharging fluid;
(b) a partition within said housing for dividing the fluid received through said entry port into first and second channels which are in communication with said first output port, said second channel also being in communication with said second output port;
(c) a first ball valve, rotatably connected within said first channel, having a hole through which fluid may flow from said entry port to said first output port, and a wall which prevents fluid from flowing to said first output port; and
(d) a second ball valve, rotatably connected within said second channel and controlling the degree of opening of said second output port, having a hole through which fluid may flow to said first output port and a wall which directs fluid to said second output port, rotation of said first ball valve from a position wherein all of the fluid in said first channel flows to said first output port creating a back pressure which increases the fluid flow through said second ball valve.

15. A valve assembly according to claim 14 further including a second partition within said housing to provide a third channel in communication with said first output port, said second partition having an aperture through which fluid may flow from said entry port to said third channel, and a pressure relief valve closing said aperture and opening said aperture in response to the pressure of fluid in said valve assembly.

* * * * *